United States Patent
Zhang et al.

(10) Patent No.: US 12,192,407 B2
(45) Date of Patent: *Jan. 7, 2025

(54) BATCH RINGING FOR LARGE CALL QUEUES

(71) Applicant: Zoom Video Communications, Inc., San Jose, CA (US)

(72) Inventors: Fengkai Zhang, Hefei (CN); Hongjian Zhao, Campbell, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,516

(22) Filed: Sep. 27, 2023

(65) Prior Publication Data

US 2024/0031486 A1 Jan. 25, 2024

Related U.S. Application Data

(63) Continuation of application No. 17/443,947, filed on Jul. 28, 2021, now Pat. No. 11,811,972.

(51) Int. Cl.
*H04M 3/00* (2024.01)
*H04M 3/42* (2006.01)
*H04M 3/51* (2006.01)
*H04M 3/523* (2006.01)

(52) U.S. Cl.
CPC ..... *H04M 3/5191* (2013.01); *H04M 3/42365* (2013.01); *H04M 3/5175* (2013.01); *H04M 3/5234* (2013.01)

(58) Field of Classification Search
CPC ........... H04M 3/5191; H04M 3/42365; H04M 3/5175; H04M 3/5234
USPC ....... 379/265.01–265.14, 266.01–266.1, 309
See application file for complete search history.

(56) References Cited

U.S. PATENT DOCUMENTS

| | | |
|---|---|---|
| 5,341,412 A | 8/1994 | Ramot et al. |
| 5,815,566 A * | 9/1998 | Ramot .................. H04M 3/523 379/266.07 |
| 6,801,619 B1 | 10/2004 | Bae |
| 7,023,979 B1 | 4/2006 | Wu et al. |
| 8,068,601 B2 | 11/2011 | Shaffer et al. |
| 8,467,354 B1 | 6/2013 | Jerkunica et al. |
| 8,767,944 B1 | 7/2014 | Davis et al. |
| 9,292,861 B2 | 3/2016 | Spievak et al. |
| 10,104,236 B1 | 10/2018 | Liu et al. |
| 10,165,109 B1 | 12/2018 | Custance |
| 2002/0114323 A1 | 8/2002 | Chowdhury et al. |
| 2003/0156704 A1 | 8/2003 | Dezonno et al. |

(Continued)

OTHER PUBLICATIONS

International Search Report and Written Opinion mailed on Oct. 19, 2022 in corresponding PCT Application No. PCT/US2022/036210.

*Primary Examiner* — William J Deane, Jr.
(74) *Attorney, Agent, or Firm* — Young Basile Hanlon & MacFarlane, P.C.

(57) ABSTRACT

Calls for large call queues are handled by a system that assigns agents of a call queue to one of a first group or a second group. A size of the first group or the second group is based on a number of agents in the call queue that are online. The system batch rings each agent of the first group when an incoming call is received. If the incoming call is unanswered by the first group, the system batch rings each agent of the second group.

20 Claims, 11 Drawing Sheets

(56) References Cited

U.S. PATENT DOCUMENTS

| | | |
|---|---|---|
| 2009/0261157 A1* | 10/2009 | Kumar .................. G06Q 10/10 |
| | | 235/375 |
| 2010/0226490 A1 | 9/2010 | Schultz et al. |
| 2012/0300920 A1* | 11/2012 | Fagundes .............. H04M 3/523 |
| | | 379/265.05 |
| 2014/0093063 A1 | 4/2014 | Hu |
| 2015/0016600 A1 | 1/2015 | Desai et al. |
| 2015/0139417 A1 | 5/2015 | Brown et al. |
| 2017/0374197 A1 | 12/2017 | Rumpf |
| 2018/0367672 A1 | 12/2018 | Ristock et al. |
| 2018/0375998 A1 | 12/2018 | Beilis et al. |
| 2020/0137231 A1 | 4/2020 | Revanur et al. |
| 2021/0132748 A1 | 5/2021 | Paiva |
| 2021/0136218 A1 | 5/2021 | Paiva |

* cited by examiner

BATCH RINGING FOR LARGE CALL QUEUES

CROSS-REFERENCE TO RELATED APPLICATION(S)

This application is a continuation of U.S. patent application Ser. No. 17/443,947, filed Jul. 28, 2021, the entire disclosure of which is hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
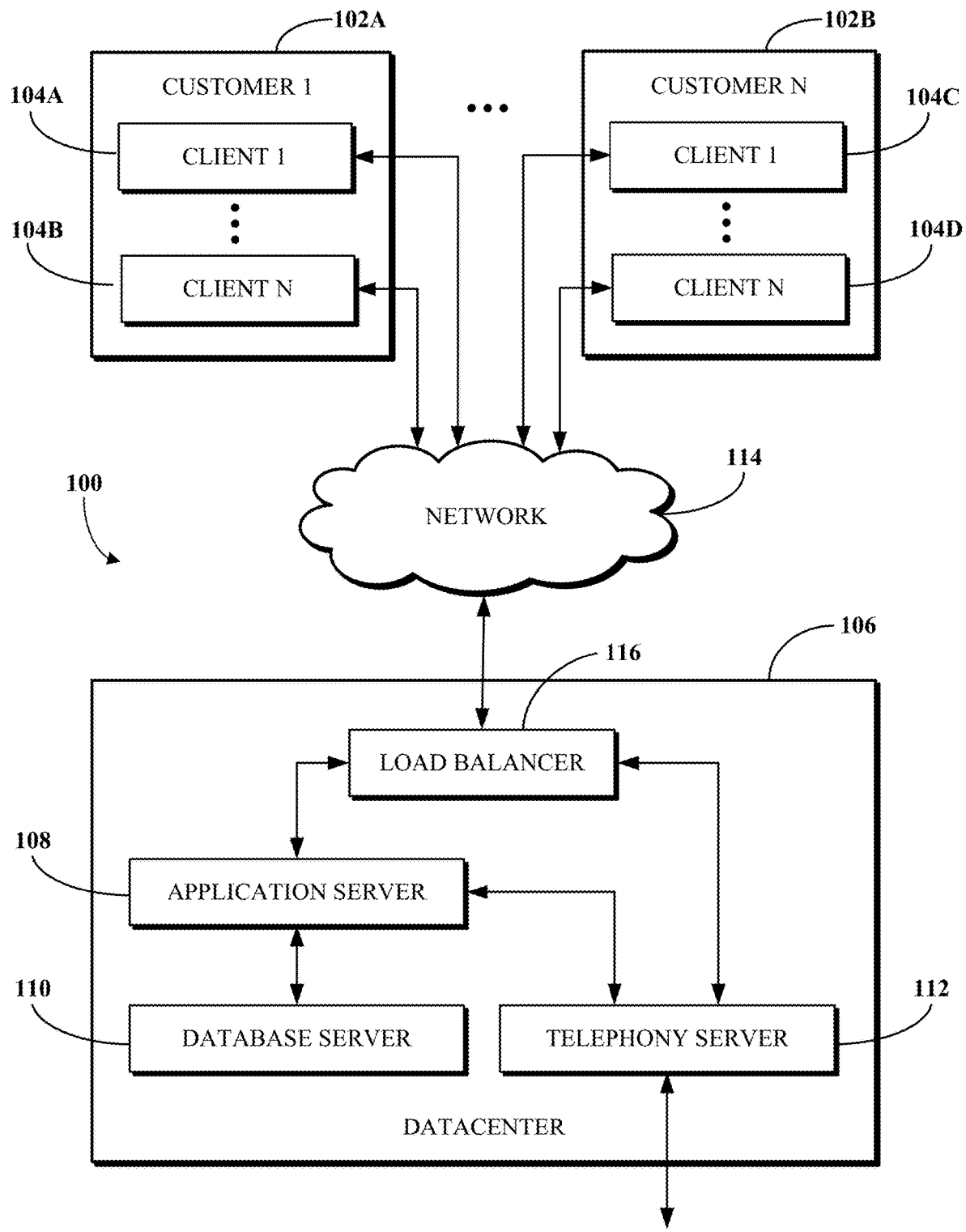
FIG. 1 is a block diagram of an example of an electronic computing and communications system.

Disclosed herein are, inter alia, implementations of systems and techniques for group handling of calls or interactions for large call queues.

One aspect of this disclosure is a method that includes assigning agents of a call queue to one of a first group and a second group. The agents may be assigned based on a call status. The call status may be an idle call status that indicates that the agent is available to answer an incoming call. A size of the first group and the second group may be based on a determination of a number of agents of the call queue that are online. The number of agents of the call queue that are online may include idle call status agents and busy call status agents. The method may include batch ringing the agents of the first group, for example, responsive to receiving an incoming call. The method may include batch ringing the agents of the second group, for example, responsive to a determination that the incoming call is unanswered by the first group.

Another aspect of this disclosure is a system that comprises a server. The server may be configured to assign agents of a call queue to one or a first group and a second group. The server may assign the agents based on whether the agents are available to answer an incoming call. The server may determine a size of the first group and the second group based on a number of agents of the call queue that are online. The number of agents of the call queue that are online may include idle call status agents and busy call status agents. The server may batch ring the agents of the first group, for example, responsive to receiving an incoming call. The server may batch ring the agents of the second group, for example, responsive to a determination that the incoming call is unanswered by the first group.

Another aspect of this disclosure includes a non-transitory computer-readable medium comprising instructions stored on a memory, that when executed by a processor cause the processor to assign agents of a call queue to one or a first group and a second group. The server may assign the agents based on an idle call status. The processor may determine a size of the first group and the second group based on a number of agents of the call queue that are online. The number of agents of the call queue that are online may include idle call status agents and busy call status agents. The processor may batch ring the agents of the first group, for example, responsive to receiving an incoming call. The processor may batch ring the agents of the second group, for example, responsive to a determination that the incoming call is unanswered by the first group.

A unified communications as a service (UCaaS) platform, which includes several communications services integrated over a network, such as the Internet, may be used to deliver a complete communication experience regardless of physical location. The UCaaS platform may be implemented in a call center or contact center setting, where a call center setting includes a setting where agents handle inbound, outbound or blended phone calls, and a contact center setting includes a setting where agents handle services that may include interactions associated with voice over internet protocol (VOIP), texts, webchat, video chat, social media, email and other digital services.

Call centers and contact centers may batch ring multiple agents to reduce call wait times. Batch ringing multiple agents can introduce call latency since only one call can be processed at a time. Call latency increases as the number of agents in the call queue increases. Small call centers or contact centers, for example call centers or contact centers that have a call queue of 50 agents or less, may be capable of batch ringing all the agents of the call queue with tolerable call latency. However, for large call centers or contact centers, for example call centers or contact centers that have a call queue of 50 agents or more, cannot batch ring the agents of the call queue without experiencing excessive call latency. In an example call center or contact center having a call queue of 300 agents, even if the ringing time of the 300 agents is optimized to within 20 seconds, the load of this call queue would be able to handle three incoming calls per minute, which would lead to extremely long wait times for customers, and would therefore be impractical.

Implementations of this disclosure address problems such as these by assigning agents of large call queues to groups to support batch ringing, such that sequential batch ringing of the members of each group may be performed to reduce call latency. Batch ringing may include substantially simultaneous ringing of the members of each group, simultaneous ringing of the members of each group, or sequential ringing of the members of each group. The large call queues may include at least 50 agents, and in some examples, may include over 300 agents. Each group may include up to 50 agents. Concurrency for batch ringing may be negatively affected if the group size is too large. The group size may be set based on the amount of online call queue members to maintain a high concurrency. In some examples, the group size may be determined based on a call latency. For example, the group size may be determined to maintain a call latency of 10 seconds or less. The batch ringing may be performed in a rotating manner or according to an agent idle time. The agent idle time may be determined based on the last time that the agent answered a call or interaction. In an example, agents may be ranked from highest agent idle time to lowest agent idle time, and agents with the highest agent idle time may be selected for batch ringing. For example, the agents of a first group may have a higher average agent idle time than the agents of a second group. In this example, the agents of the first group may be prioritized for batch ringing over the agents of the second group based on the higher average agent idle time. When a call goes unanswered in a current group, a next group is selected for ringing until the call is answered.

The implementations of this disclosure address group handling of calls and/or interactions in which a call is a communication over a telephone network associated with a phone call and an interaction is a communication associated with voice over internet protocol (VOIP), short messaging service (SMS) text, webchat, video chat, social media, email, and other digital services. Thus, the implementations of this disclosure may be used in a call center setting, a contact center setting, or like settings.

To describe some implementations in greater detail, reference is first made to examples of hardware and software structures used to implement group handling of calls for large call queues. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be VOIP-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
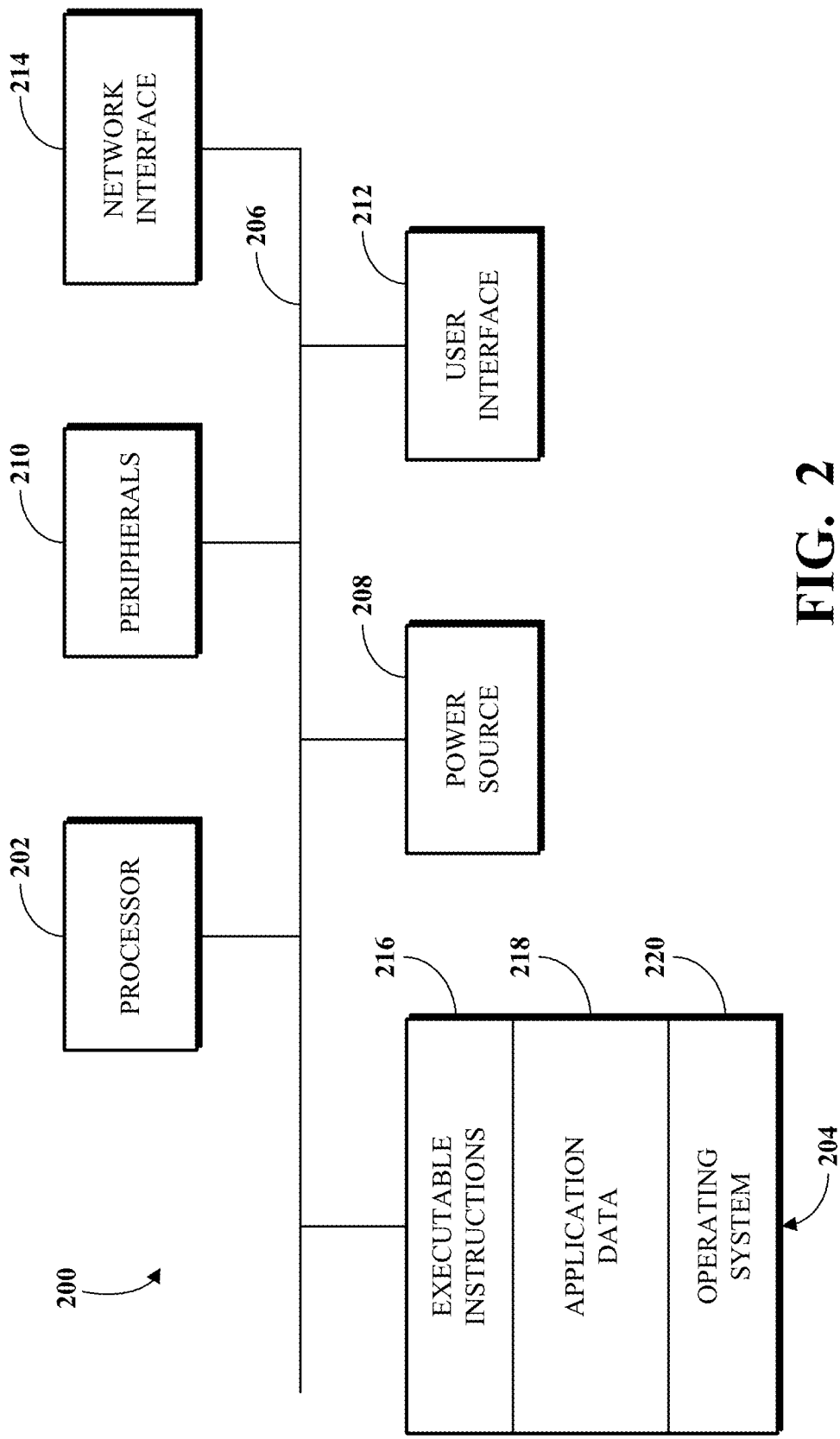
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, phase-change memory, or another form of non-volatile memory configured for persistent electronic information storage. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 may provide power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee), infrared, visible light, general packet radio service (GPRS), global system for mobile communications (GSM), code-division multiple access (CDMA), Z-Wave, another protocol, or a combination thereof.

Figure 3:
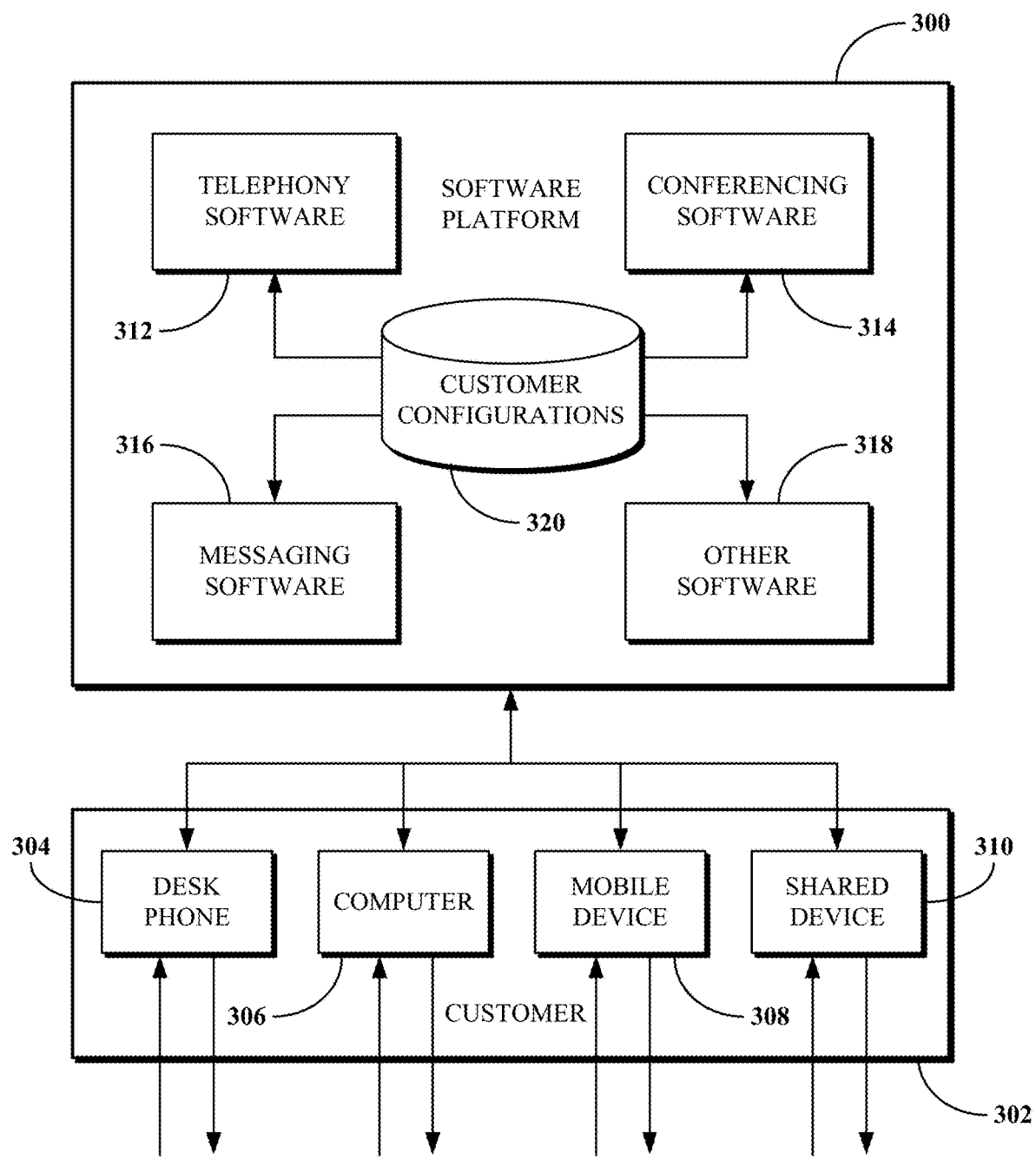
FIG. 3 is a block diagram of an example of a software platform implemented by an electronic computing and communications system.

FIG. 3 is a block diagram of an example of a software platform 300 implemented by an electronic computing and communications system, such as the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include batch ring functionality for large call queues.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
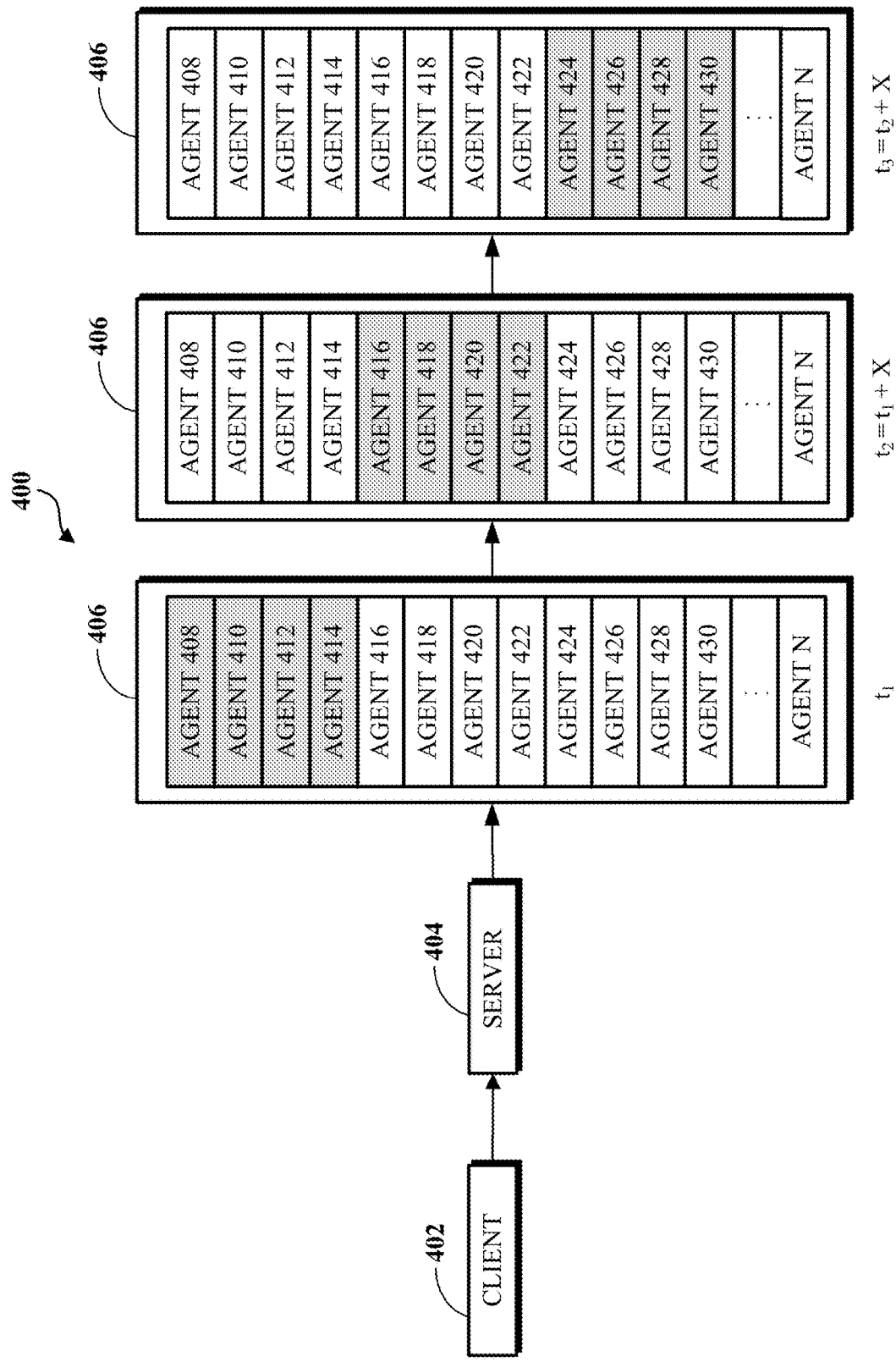
FIG. 4 is a block diagram of an example of a system for handling calls for a large call queue.

FIG. 4 is a block diagram of an example of a system 400 for handling calls for a large call queue. The system 400 includes a client 402, a server 404, and a call queue 406. The client 402, may be a client such as one of clients 304 through 310 shown in FIG. 3. The server 404 may be a PBX server, and may be associated with a datacenter, such as datacenter 106 shown in FIG. 1. The call queue 406 includes a number of agents, for example, agent 408 to agent N. The call queue 406 is a large call queue that may have over 50 agents, and in some cases, over 300 agents.

As shown in FIG. 4, a call or interaction is initiated by a user via the client 402, for example, via a graphical user interface (GUI) of the client 402. The client 402 is configured to transmit the call or interaction to the server 404. The server 404 is configured to assign the agents of the call queue 406 to groups. The server 404 may assign the agents of the call queue 406 to groups based on an idle call status of individual agents. An idle call status indicates that the agent is available to answer an incoming call or interaction. The size of the groups may be determined based on a number of agents that are online. The number of agents that are online represent the total number of agents logged into the system 400 including the number of agents that have an idle call status and the number of agents that have a busy call status. A busy call status indicates that the agent is currently on a call and unavailable to answer an incoming call. In some examples, the size of the groups may be based on an administrator setting. In some examples, the size of the groups may be dynamic such that they are based on a call volume. For example, the size of the group may decrease as the call volume increases such that a number of agents per group decreases and the number of groups increases to increase the call handling throughput. In some examples, the group size may be determined based on a call latency. For example, the group size may be determined to maintain a call latency of 10 seconds or less.

In the example shown in FIG. 4, agents 408-414 are assigned to a first group, agents 416-422 are assigned to a second group, and agents 424-430 are assigned to a third group, and so on. The server 404 receives the call or interaction from the client 402 and batch rings the agents of the first group, i.e., agents 408-414 at time $t_1$. If the incoming call or interaction goes unanswered in the first group, the server 404 batch rings the agents of the second group, i.e., agents 416-422 at time $t_2$, where $t_2=t_1+X$, where X is the call latency associated with ringing the first group. In an example, X may be 10 seconds or less and may be a configurable value. If the incoming call or interaction goes unanswered in the second group, the server 404 batch rings the agents of the third group, i.e., agents 422-430 at time $t_3$, where $t_3=t_2+X$, where X is the call latency associated with ringing the second group. If the incoming call or interaction goes unanswered in the third group, the server will batch ring a next group and sequentially ring each subsequent group until the call is answered or a maximum wait time threshold has been met. If the maximum wait time threshold has been met, the call or interaction may be routed to a voicemail box or escalated to a supervisor.

Figure 5:
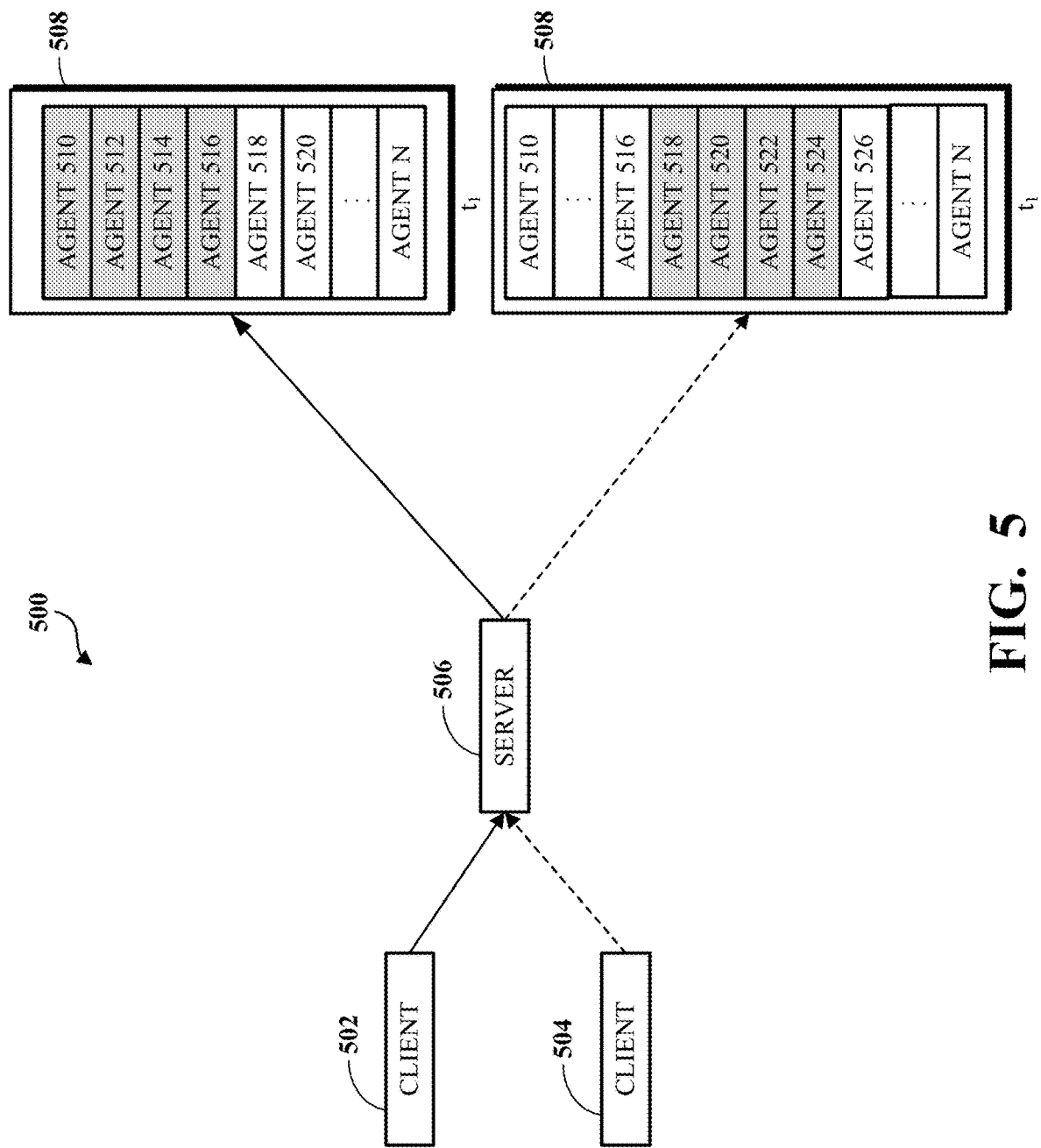
FIG. 5 is a block diagram of an example of a system for performing parallel processing of multiple calls for a large call queue.

FIG. 5 is a block diagram of an example of a system 500 for performing parallel processing of multiple calls for a large call queue. The system 500 includes a client 502, a client 504, a server 506, and a call queue 508. The client 502, may be a client such as one of clients 304 through 310 shown in FIG. 3, and the client 504 may be a client such as client 104C shown in FIG. 1. The server 506 may be a PBX server, and may be associated with a datacenter, such as datacenter 106 shown in FIG. 1. The call queue 508 includes a number of agents, for example, agent 510 to agent N. The call queue 508 is a large call queue that may have over 50 agents, and in some cases, may have over 300 agents.

As shown in FIG. 5, a first call or interaction is initiated by a user via the client 502, for example, via a GUI of the client 502. The client 502 is configured to transmit the call or interaction to the server 506. A second call or interaction is initiated by another user via the client 504, for example, via a GUI of the client 504. The client 504 is configured to transmit the call or interaction to the server 506.

The server 506 is configured to assign the agents of the call queue 508 to groups. The server 506 may assign the agents of the call queue 508 to groups based on an idle call status. The size of the groups may be determined based on a number of agents that are online. The number of agents that are online represent the total number of agents logged into the system 500 including the number of agents that have an idle call status and the number of agents that have a busy call status. In some examples, the size of the groups may be based on an administrator setting. In some examples, the size of the groups may be dynamic such that they are based on a call volume. For example, the size of the group may decrease as the call volume increases such that a number of agents per group decreases and the number of groups increases to increase to call handling throughput. In some examples, the group size may be determined based on a call latency. For example, the group size may be determined to maintain a call latency of 10 seconds or less.

In the example shown in FIG. 5, agents 510-516 are assigned to a first group, and agents 518-524 are assigned to a second group, and so on. In this example, the server 506 receives the first call or interaction and the second call or interaction simultaneously. The server 506 receives the first call or interaction from the client 502 and batch rings the agents of the first group, i.e., agents 510-516 at time $t_1$. The server 506 receives the second call or interaction from the client 504 and batch rings the agents of the second group, i.e., agents 510-516 at time $t_1$.

Figure 6:
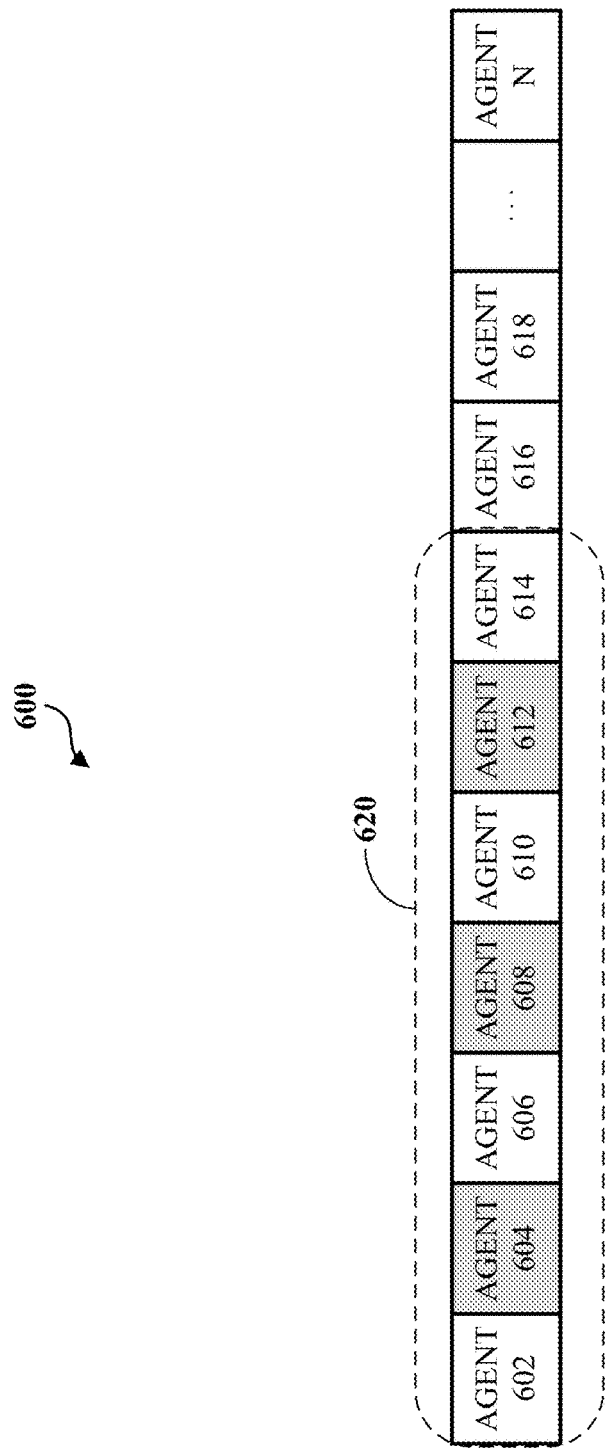
FIG. 6 is a diagram of an example of a rotating call structure.

FIG. 6 is a diagram of an example of a rotating call structure 600. In order to spread the number of calls or interactions equally among the agents of a call queue, the rotating call structure 600 may be implemented to average the distribution of calls or interactions over the agents of the call queue. The rotating call structure 600 may be implemented in the system 400 shown in FIG. 4 and the system 500 shown in FIG. 5.

As shown in FIG. 6, the rotating call structure 600 includes a number of agents, for example, agent 602 to agent N. In the rotating call structure 600, the agents are not pre-grouped. The system may determine the size of the groups based on a number of agents that are online. The number of agents that are online represent the total number of agents logged into the system including the number of agents that have an idle call status and the number of agents that have a busy call status. In some examples, the size of the groups may be based on an administrator setting. In some examples, the size of the groups may be dynamic such that they are based on a call volume. For example, the size of the group may decrease as the call volume increases such that a number of agents per group decreases and the number of groups increases to increase the call handling throughput. In some examples, the group size may be determined based on a call latency. For example, the group size may be determined to maintain a call latency of 10 seconds or less.

For example, if the administrator set the rotation to batch ring 4 agents, the system may be configured to select 4 agents to ring each time an incoming call or interaction is received, for example, based on agent availability. In this example, agent 604, agent 608, and agent 612 have a call status that indicates that they are busy or otherwise unavailable to answer an incoming call or interaction. The agents of each group of the rotating call structure 600 are not fixed, such that if agent 604, agent 608, and agent 612 are busy, the system may be configured to batch ring agent 602, agent 606, agent 610, and agent 614 as a group 620. In this example, the system may batch ring agent 602, agent 606, agent 610, and agent 614 as a group 620 based on a call status that indicates that they are available to answer an incoming call or interaction.

Figure 7:
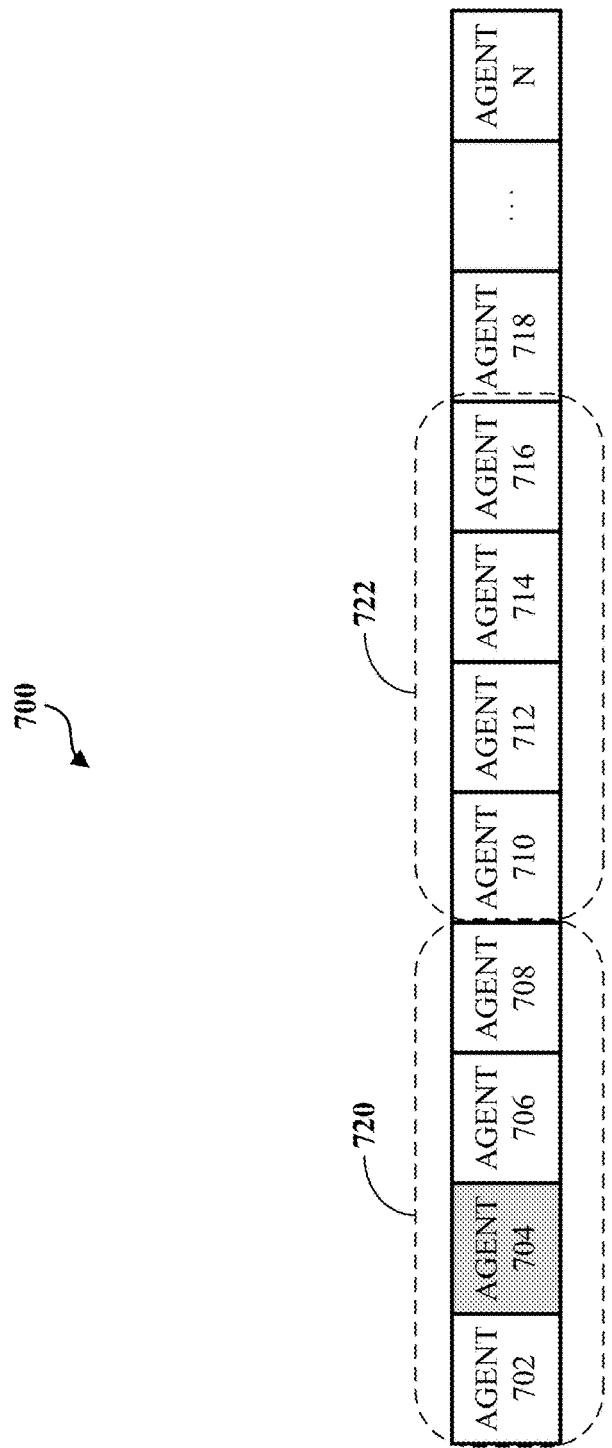
FIG. 7 is a diagram of an example of a rotating call structure for even ring distribution over a large call queue.

FIG. 7 is a diagram of an example of a rotating call structure 700 for even ring distribution over a large call queue. The rotating call structure 700 may be implemented in the system 400 shown in FIG. 4 and the system 500 shown in FIG. 5. In some examples, the rotating call structure 700 may be implemented in conjunction with rotating call structure 600 shown in FIG. 6.

The rotating call structure 700 includes a number of agents, such as agent 710 to agent N. In this example, the rotating call structure 700 includes a first group 720 and a second group 722. The system may determine the size of the first group 720 and the second group 722 based on a number of agents that are online. The number of agents that are online represent the total number of agents logged into the system including the number of agents that have an idle call status and the number of agents that have a busy call status. In some examples, the size of the groups may be based on an administrator setting. In some examples, the size of the groups may be dynamic such that they are based on a call volume. For example, the size of the group may decrease as the call volume increases such that a number of agents per group decreases and the number of groups increases to increase the call handling throughput. In some examples, the group size may be determined based on a call latency. For example, the group size may be determined to maintain a call latency of 10 seconds or less.

In this example, the first group 720 includes agent 702, agent 704, agent 706, and agent 708, and the second group 722 includes agent 710, agent 712, agent 714, and agent 716. The rotating call structure 700 is configured to evenly spread out the ring distribution by saving the last agent identification (ID) of the group that answered a prior incoming call or interaction. The agent ID may include metadata that is associated with a current group to which the agent is assigned. As shown in FIG. 7, the system has saved the agent ID of agent 704 as the last agent to have answered an incoming call or interaction. When a second incoming call or interaction is received, the system will batch ring the agents of the second group 722, for example, based on a determination that the last call was answered by an agent of the first group 720.

Since the agent 704 answered the last call or interaction, an agent idle time for agent 704 is set to zero. For the agents that did not answer the last call or interaction, respective agent idle times are set based on the last time that the respective agent answered a call or interaction. In an example where the system does not pre-group the agents, agent 704 may be excluded from a next grouping for a next incoming call or interaction based on the agent idle time being zero or less than other agents of the call queue.

To further describe some implementations in greater detail, reference is next made to examples of methods that may be performed by or using a system for handling calls and interactions for large call queues. The methods described in FIGS. 8-11 can be executed using computing devices, such as the systems, hardware, and software described with respect to FIGS. 1-7. The methods can be performed, for example, by executing a machine-readable program or other computer-executable instructions, such as routines, instructions, programs, or other code. The steps, or operations, of the methods or other techniques, methods, processes, or algorithms described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Figure 8:
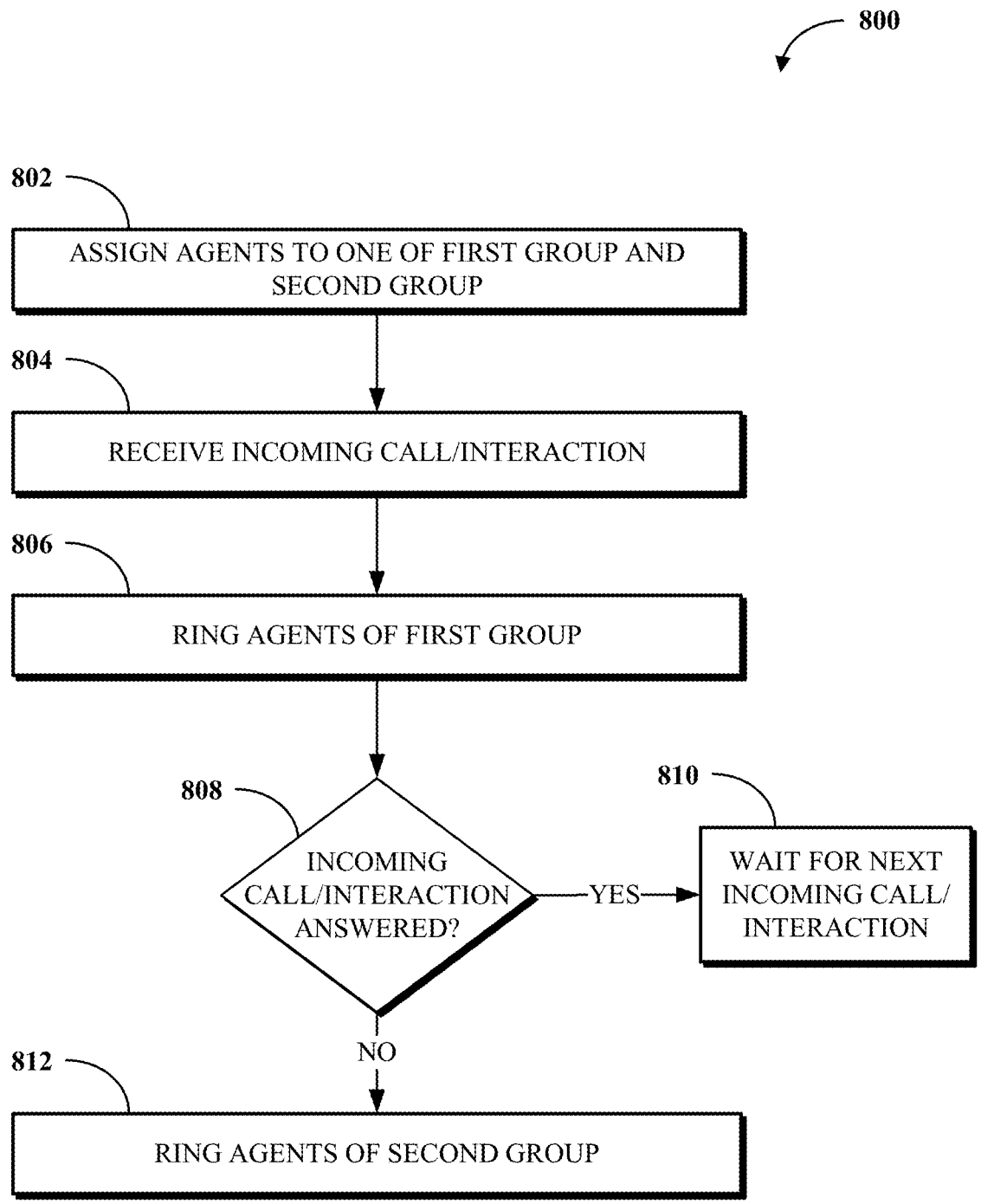
FIG. 8 is a flowchart of an example of a method for handling calls for a large call queue.

FIG. 8 is a flowchart of an example of a method 800 for handling calls for a large call queue, such as the call queue 406 shown in FIG. 4 or the call queue 508 shown in FIG. 5. At 802, a server, such as the server 404 shown in FIG. 4 or the server 506 shown in FIG. 5, assigns agents of a call queue to one of a first group and a second group. The server may assign the agents of the call queue to one of any number of groups, and two groups are described here for simplicity and clarity.

The server may assign the agents of the call queue to groups based on an idle call status. The size of the groups may be determined based on a number of agents that are online. The number of agents that are online represent the total number of agents logged into the system including the number of agents that have an idle call status and the number of agents that have a busy call status. In some examples, the size of the groups may be based on an administrator setting. In some examples, the size of the groups may be dynamic such that they are based on a call volume. For example, the size of the group may decrease as the call volume increases such that a number of agents per group decreases and the number of groups increases to increase the call handling throughput. In some examples, the group size may be determined based on a call latency. For example, the group size may be determined to maintain a call latency of 10 seconds or less.

At 804, the server receives an incoming call or interaction. At 806, the server batch rings the agents of the first group as a batch. At 808, the server determines whether the incoming call or interaction was answered by an agent of the first group. If the server determines that the incoming call or interaction was answered by an agent of the first group, the server waits for a next incoming call or interaction at 810. If the server determines that the incoming call or interaction was not answered by an agent of the first group, the server batch rings the agents of the second group as a batch at 812. If the incoming call or interaction goes unanswered in the second group, the server will batch ring a next group and sequentially ring each subsequent group until the call is answered or a maximum wait time threshold has been met. If the maximum wait time threshold has been met, the call or interaction may be routed to a voicemail box or escalated to a supervisor.

Figure 9:
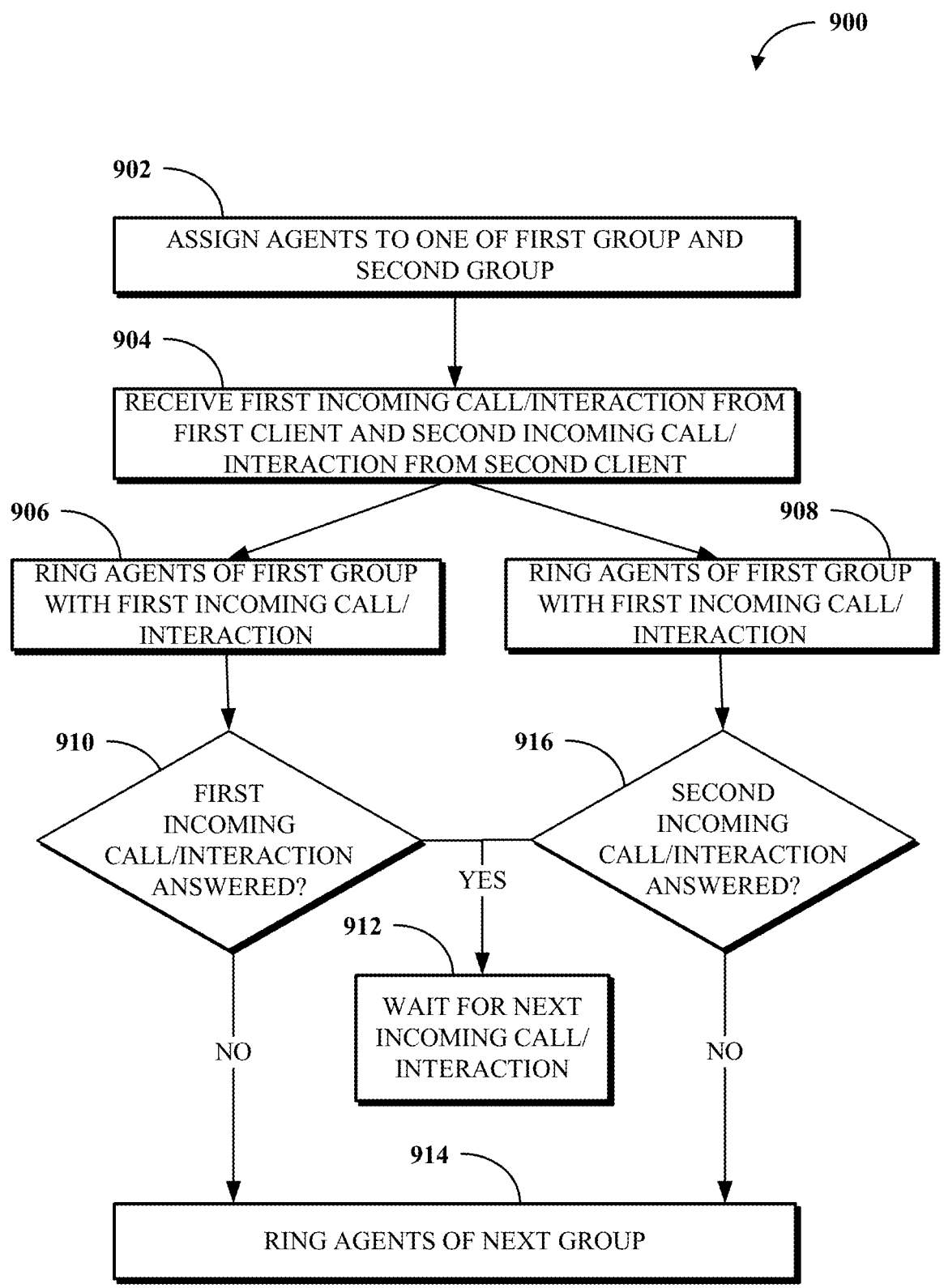
FIG. 9 is a flowchart of an example of a method for performing parallel processing of multiple calls for a large call queue.

FIG. 9 is a flowchart of an example of a method 900 for performing parallel processing of multiple calls for a large call queue, such as call queue 406 shown in FIG. 4 or call queue 508 shown in FIG. 5. At 902, a server, such as the server 404 shown in FIG. 4 or the server 506 shown in FIG. 5, assigns agents of a call queue to one of a first group and a second group. The server may assign the agents of the call queue to one of any number of groups, and two groups are described here for simplicity and clarity.

The server may assign the agents of the call queue to groups based on an idle call status. The size of the groups may be determined based on a number of agents that are online. The number of agents that are online represent the total number of agents logged into the system including the number of agents that have an idle call status and the number of agents that have a busy call status. In some examples, the size of the groups may be based on an administrator setting. In some examples, the size of the groups may be dynamic such that they are based on a call volume. For example, the size of the group may decrease as the call volume increases such that a number of agents per group decreases and the number of groups increases to increase the call handling throughput. In some examples, the group size may be determined based on a call latency. For example, the group size may be determined to maintain a call latency of 10 seconds or less.

At 904, the server receives a first incoming call or interaction from a first client and a second incoming call or interaction from a second client. The first incoming call or interaction and the second incoming call or interaction may be received substantially simultaneously. At 906, the server batch rings the agents of the first group, and at 908, the server batch rings the agents of the second group.

At 910, the server determines whether the first incoming call or interaction was answered by an agent of the first group. If the server determines that the first incoming call or interaction was answered by an agent of the first group, the server waits for a next incoming call or interaction at 912. If the server determines that the first incoming call or interaction was not answered by an agent of the first group, the server batch rings the agents of a next group at 914. If the incoming call or interaction goes unanswered in the next group, the server will batch ring a subsequent group and sequentially batch ring each subsequent group until the call is answered or a maximum wait time threshold has been met. If the maximum wait time threshold has been met, the call or interaction may be routed to a voicemail box or escalated to a supervisor.

At 916, the server determines whether the second incoming call or interaction was answered by an agent of the second group. If the server determines that the second incoming call or interaction was answered by an agent of the second group, the server waits for a next incoming call or interaction at 912. If the server determines that the second incoming call or interaction was not answered by an agent of the second group, the server batch rings the agents of a next group as a batch at 914. If the incoming call or interaction goes unanswered in the next group, the server will batch ring a subsequent group and sequentially ring each subsequent group until the call is answered or a maximum wait time threshold has been met. If the maximum wait time threshold has been met, the call or interaction may be routed to a voicemail box or escalated to a supervisor.

Figure 10:
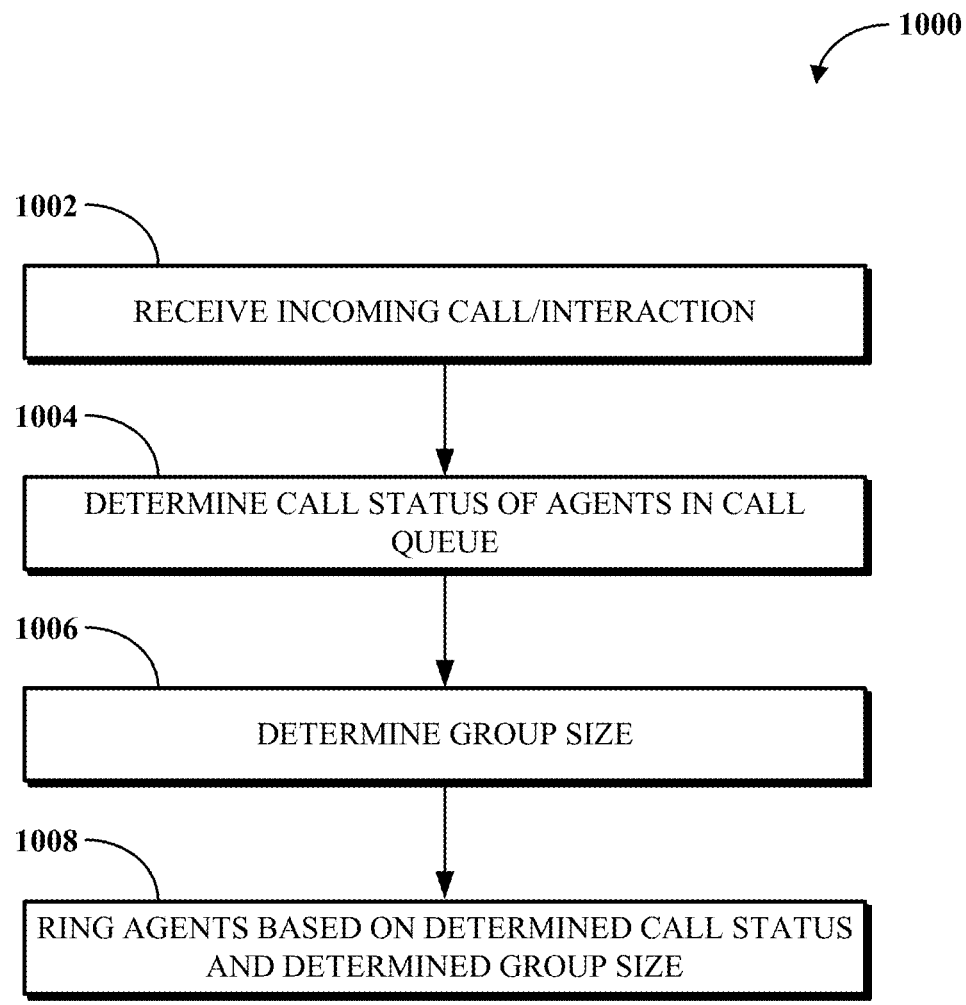
FIG. 10 is a flowchart of an example of a method for ring distribution over a large call queue.

FIG. 10 is a flowchart of an example of a method 1000 for ring distribution over a large call queue, such as the call queue 406 shown in FIG. 4 or the call queue 508 shown in FIG. 5. In order to spread the number of calls or interactions equally among the agents of a call queue, the method 1000 may be performed to average the distribution of calls or interactions over the agents of the call queue.

In this example, the agents of the call queue may not be pre-grouped by the server. At 1002, the server may receive an incoming call or interaction. At 1004, the server determines a call status of the agents in the call queue. Determining the call status of the agents includes determining which agents are available to answer an incoming call or interaction. For example, an agent that is available to answer an incoming call or interaction will have an idle call status. Determining the call status of the agents may include determining an agent idle time. The agent idle time may be determined based on the last time that the agent answered a call or interaction.

At 1006, the server determines the group size. The server may determine the size of the groups based on a number of agents that are online. The number of agents that are online represent the total number of agents logged into the system including the number of agents that have an idle call status and the number of agents that have a busy call status. In some examples, the size of the groups may be based on an administrator setting. In some examples, the size of the groups may be dynamic such that they are based on a call volume. For example, the size of the group may decrease as the call volume increases such that a number of agents per group decreases and the number of groups increases to increase the call handling throughput. In an example, the group size may be determined based on a call latency. For example, the group size may be determined to maintain a call latency of 10 seconds or less.

At 1008, the server batch rings a group of agents. The server may batch ring the group of agents based on the determined call status, the determined group size, or both. In an example where the group size is determined to be four agents, the server may batch ring the first four agents that are available to answer an incoming call or interaction. In some examples, the server may group the agents based on the agent idle times. For example, agents may be ranked from highest agent idle time to lowest agent idle time, and agents with the highest agent idle time may be selected for batch ringing. For example, the agents of a first group may have a higher average agent idle time than the agents of a second group. In this example, the agents of the first group may be prioritized for batch ringing over the agents of the second group based on the higher average agent idle time. In an example where the group size is determined to be four agents, the agents with the four highest agent idle times may be selected for batch ringing.

Figure 11:
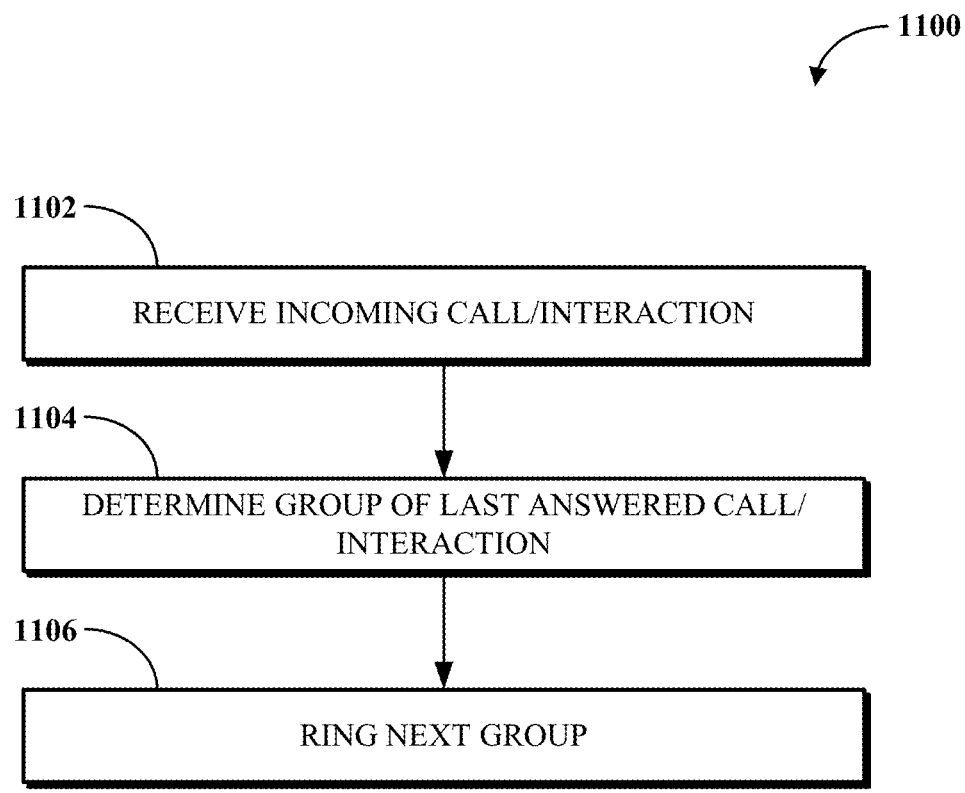
FIG. 11 is a flowchart of another example of a method for ring distribution over a large call queue.

FIG. 11 is a flowchart of another example of a method 1100 for ring distribution over a large call queue, such as the call queue 406 shown in FIG. 4 or the call queue 508 shown in FIG. 5. At 1102, a server receives an incoming call or interaction. At 1104, the server determines which group answered the last call or interaction. The server may determine which group answered the last call or interaction based on an agent ID that is associated with a respective group. At 1106, the server batch rings the agents of the next group, for example, based on the determined group that answered the last call or interaction.

An aspect includes a method that includes determining a size of a first group and a second group based on online agents of a call queue. The method includes assigning the online agents to the first group or to the second group based on a rotating structure that is based on a respective agent idle time. The method includes responsive to receiving an incoming call, batch ringing each agent of the first group. The method includes batch ringing each agent of the second group when the incoming call is unanswered by an agent of the first group.

An aspect includes a server. The server is configured to determine a size of a first group and a second group based on online agents of a call queue. The server is configured to assign the online agents to the first group or the second group based on a rotating structure that is based on a respective agent idle time. The server is configured to, responsive to an incoming call, batch ring each agent of the first group. The server is configured to batch ring each agent of the second group when the incoming call is unanswered by an agent of the first group.

An aspect includes a non-transitory computer-readable medium comprising instructions stored on a memory, that when executed by a processor, cause the processor to determine a size of a first group and a second group based on online agents of a call queue. The processor is configured to assign the online agents to the first group or the second group based on a rotating structure that is based on a respective agent idle time. The processor is configured to, responsive to an incoming call, batch ring each agent of the first group. The processor is configured to batch ring each agent of the second group when the incoming call is unanswered by an agent of the first group.

In one or more aspects, the call queue may have a call latency of about 10 seconds. In one or more aspects, the agents of the call queue may not be pre-grouped. In one or more aspects, the incoming call may be routed to a voicemail box when a wait time threshold is met. In one or more aspects, a group size of the first group and the second group may be a static size. In one or more aspects, a group size of the first group and the second group may be a static size, and wherein the group size is based on a call latency of about 10 seconds. In one or more aspects, a group size of the first group and the second group may be a dynamic size. In one or more aspects, the group size may be based on a call volume. In one or more aspects, the group size may increase as the call volume increases. In one or more aspects, a call queue agent that answered a previous call may be excluded. In one or more aspects, the incoming call may be routed to a supervisor when a wait time threshold is met. In one or more aspects, the agent idle time may be determined based on a time that an agent last answered a call. In one or more aspects, the agents of the call queue may be ranked from a highest agent idle time to a lowest agent idle time. In one or more aspects, the first group may have a higher average agent idle time than the second group.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    determining a group size of a first agent group and a second agent group based on online agents of a call queue;
    assigning the online agents to the first agent group or to the second agent group based on a rotating structure and a respective agent idle time;

responsive to receiving an incoming call, batch ringing each agent of the first agent group; and batch ringing each agent of the second agent group when the incoming call is unanswered by an agent of the first agent group.

2. The method of claim 1, wherein the call queue has a call latency of at least 10 seconds.

3. The method of claim 1, wherein the agents of the call queue are not pre-grouped.

4. The method of claim 1, further comprising:
routing the incoming call to a voicemail box when a wait time threshold is met.

5. The method of claim 1, wherein the group size of the first agent group and the second agent group is a static size.

6. The method of claim 1, wherein the group size of the first agent group and the second agent group is a static size, and wherein the group size is based on a call latency of about 10 seconds.

7. The method of claim 1, wherein the group size of the first agent group and the second agent group is a dynamic size.

8. The method of claim 1, wherein the group size of the first agent group and the second agent group is a dynamic size, and wherein the group size is based on a call volume.

9. The method of claim 1, wherein the group size of the first agent group and the second agent group is a dynamic size, wherein the group size is based on a call volume, and wherein the group size increases as the call volume increases.

10. A system, comprising:
a server configured to:
determine a group size of a first agent group and a second agent group based on online agents of a call queue;
assign the online agents to the first agent group or the second agent group based on a rotating structure and a respective agent idle time;
responsive to an incoming call, batch ring each agent of the first agent group; and
batch ring each agent of the second agent group when the incoming call is unanswered by an agent of the first agent group.

11. The system of claim 10, wherein the server is configured to exclude a call queue agent that answered a previous call.

12. The system of claim 10, wherein the incoming call is routed to a supervisor when a wait time threshold is met.

13. The system of claim 10, wherein the server is configured to determine the agent idle time based on a time that an agent last answered a call.

14. The system of claim 10, wherein the server is configured to rank the agents of the call queue from a highest agent idle time to a lowest agent idle time.

15. The system of claim 10, wherein the first group has a higher average agent idle time than the second agent group.

16. A non-transitory computer-readable medium comprising instructions stored on a memory, that when executed by a processor, cause the processor to:
determine a group size of a first agent group and a second agent group based on online agents of a call queue;
assign the online agents to the first agent group or the second agent group based on a rotating structure and a respective agent idle time;
responsive to an incoming call, batch ring each agent of the first agent group; and
batch ring each agent of the second agent group when the incoming call is unanswered by an agent of the first agent group.

17. The non-transitory computer-readable medium of claim 16, wherein the instructions, when executed by the processor, cause the processor to exclude a call queue agent that answered a previous call.

18. The non-transitory computer-readable medium of claim 16, wherein the instructions, when executed by the processor, cause the processor to determine an agent idle time based on a time that an agent last answered a call.

19. The non-transitory computer-readable medium of claim 18, wherein the instructions, when executed by the processor, cause the processor to rank the agents of the call queue from a highest agent idle time to a lowest agent idle time.

20. The non-transitory computer-readable medium of claim 18, wherein the instructions, when executed by the processor, cause the processor to assign agents to the first agent group and the second agent group such that the agents of the first agent group have a higher average agent idle time than the agents of the second agent group.

* * * * *